(12) United States Patent
Alberth, Jr. et al.

(10) Patent No.: US 6,438,381 B1
(45) Date of Patent: Aug. 20, 2002

(54) METHOD AND APPARATUS FOR LOCATION DETERMINATION OF A CELLULAR TELEPHONE

(75) Inventors: William P. Alberth, Jr., Crystal Lake; Michael Kotzin, Buffalo Grove, both of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/590,215

(22) Filed: Jun. 8, 2000

(51) Int. Cl.$^7$ ................................. H04Q 7/20
(52) U.S. Cl. ..................... 455/456; 455/343; 455/552; 342/357.06
(58) Field of Search ................... 455/343, 456, 455/552, 553, 574, 12.1, 427, 67.1, 226.1, 226.2; 342/357.01, 357.06, 357.09; 370/311, 320, 335

(56) References Cited

U.S. PATENT DOCUMENTS

| | | | |
|---|---|---|---|
| 5,448,773 A | * | 9/1995 | McBurney et al. ......... 455/343 |
| 5,535,432 A | * | 7/1996 | Dent ........................ 455/12.1 |
| 5,604,765 A | * | 2/1997 | Bruno et al. ................ 455/343 |
| 5,949,812 A | * | 9/1999 | Turney et al. .............. 455/574 |
| 6,021,330 A | | 2/2000 | Vannucci .................... 455/456 |
| 6,028,887 A | * | 2/2000 | Harrison et al. ........ 342/357.06 |
| 6,133,871 A | * | 10/2000 | Krasner ................. 342/357.06 |

FOREIGN PATENT DOCUMENTS

WO    WO 00/13034    3/2000

* cited by examiner

Primary Examiner—Nay Maung
Assistant Examiner—Quochien B. Vuong
(74) Attorney, Agent, or Firm—Paul J. Bartusiak; Randall S. Vaas

(57) ABSTRACT

A method of making a geographic location determination via a cellular telephone in signal communication with a base station. The mobile station first attempts to detect a position location signal. Upon determining that the position location signal is insufficient to use in a position location calculation, the mobile station deactivates at least a portion of a receiver. The mobile station receives a cellular communication signal and measures a signal quality of the cellular communication signal. Responsive to the signal quality improving by a predetermined amount, the mobile station reactivates the receiver portion and re-attempts to detect the position location signal.

23 Claims, 2 Drawing Sheets

METHOD AND APPARATUS FOR LOCATION DETERMINATION OF A CELLULAR TELEPHONE

FIELD OF THE INVENTION

This invention generally relates to geographic location determination. More specifically, this invention relates to geographic location determination via a cellular telephone.

BACKGROUND OF THE INVENTION

In the near future cellular telephones will have the capability to make a geographic location determination. Many methods have been proposed to implement the location determination feature in a cellular telephone. One method is to integrate a Global Positioning System (GPS) receiver in the cellular telephone. The GPS receiver periodically receives timing signals from GPS satellites and processes the timing signals to make a location determination.

Under various conditions, GPS receivers have significant trouble receiving the necessary satellite timing signals. For example, if a user is inside a building, the GPS signals may not be strong enough for the user's GPS receiver to detect the signals. The GPS signals may become even weaker (e.g. more difficult to detect) as the cellular telephone is deeper within a building and away from any windows. In this situation, the cellular telephone GPS receiver would continually check for the GPS signals, and this continuous "checking" can significantly drain the cellular telephone battery. The same problem may be encountered if other position location technology (e.g. triangulation) is employed. Therefore, there is a need for a method and apparatus for making location measurements via a cellular telephone without unnecessarily draining the battery power of the cellular telephone.

DETAILED DESCRIPTION OF PREFERRED EMBODIMENTS

Figure 1:
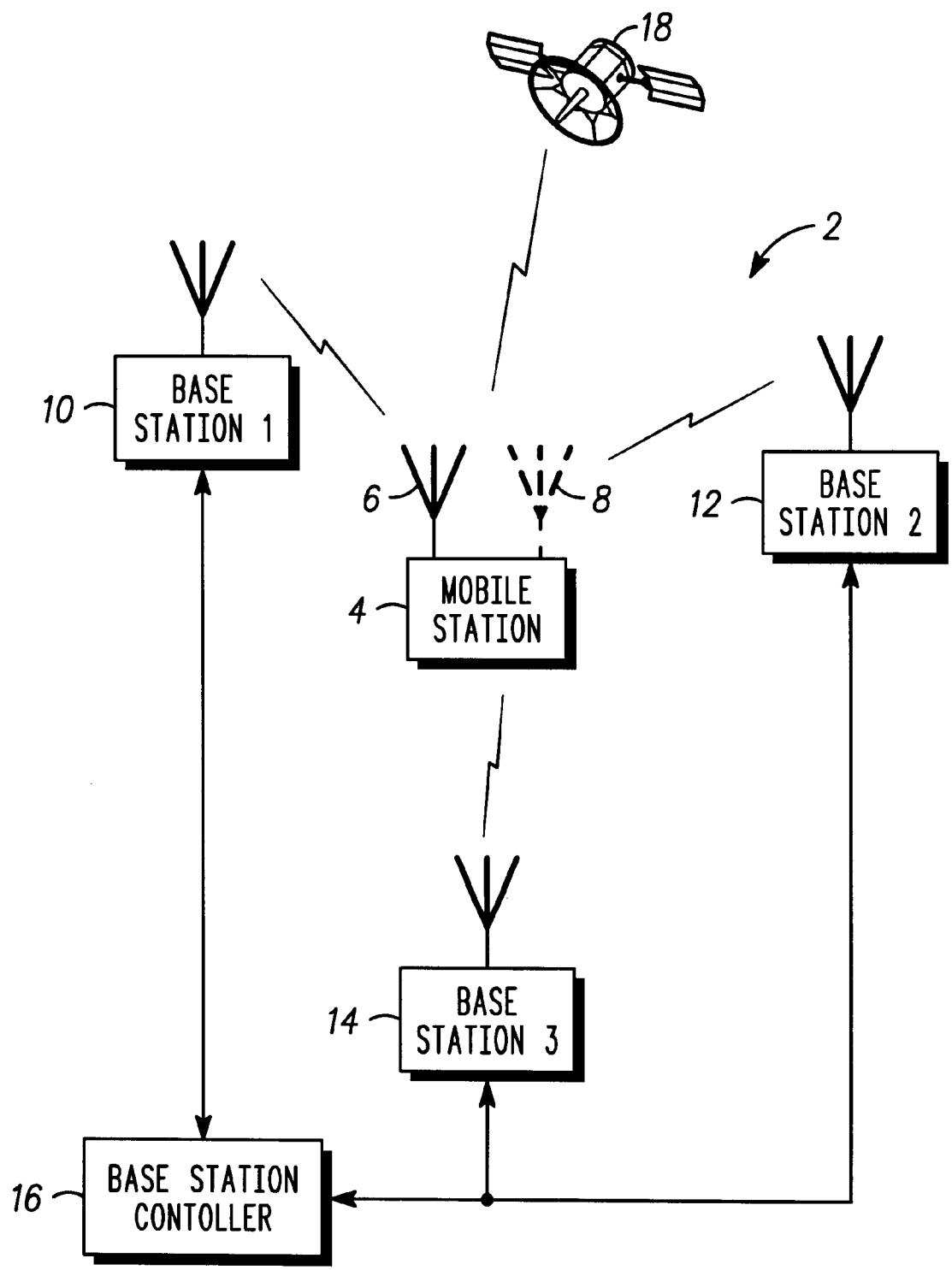
FIG. 1 is a system diagram incorporating a cellular communication network and a global positioning system (GPS) satellite for position location determination.

FIG. 1 shows a system diagram of a cellular communication network 2 incorporating global positioning system (GPS) satellites, here represented by GPS satellite 18, for position location determination. The cellular communication network 2 includes a plurality of base stations, including first base station 10, second base station 12, and third base station 14. A base station controller 16 is coupled to the plurality of base stations generally for controlling operation of the cellular communication network 2 as is known in the art. Mobile station 4 communicates to another destination via at least one of the plurality of base stations.

The cellular communication network 2 can operate using any of several kinds of communication protocols, such as code division multiple access (CDMA) technology, time division multiple access (TDMA) technology, or frequency division multiple access (FDMA) technology as is known in the art. In the illustrated embodiment, the cellular communication network 2 operates via CDMA air interface standard as outlined in TIA/EIA Interim Standard IS-95 entitled "Mobile Station-Base Station Compatibility Standard for Dual-Mode Wideband Spread Spectrum Cellular System" and incorporated by reference. Additionally, the communication network 2 can comprise a plurality of communication technologies, such as both CDMA and TDMA.

Location determination technology is employed to allow for the calculation of the geographic location of the mobile station 4. Moreover, the hardware configuration of the mobile station 4 depends upon the type of location determination system deployed.

In the illustrated embodiment, the mobile station 4 employs a global positioning system (GPS) receiver for communication with the GPS satellites 18. The mobile station 4 employs a first antenna 6 for communication with the cellular communication network 2 and a second antenna 8 for communication with the GPS satellites 18. Alternatively, the mobile station 4 may utilize a single antenna for detecting both position location signals and cellular communication signals.

For what is commonly referred to as autonomous GPS position location, the mobile station 4 acquires and measures GPS satellite signals without the aid of the cellular communication network 2. In an alternate embodiment, the cellular communication network 2 employs network assisted GPS, wherein the cellular communication network 2 provides information to the mobile station 4 to aid in acquiring the GPS satellite signals as is known in the art.

In another alternate embodiment, the mobile station 4 is equipped to receive and process downlink signals from the plurality of base stations to aid in location determination of the mobile station 4; this is commonly known as forward link triangulation. Thus, the mobile station 4 processes multiple communication signals from multiple base stations and determines the arrival times for each of the communication signals as part of the position determination as is known in the art.

Figure 2:
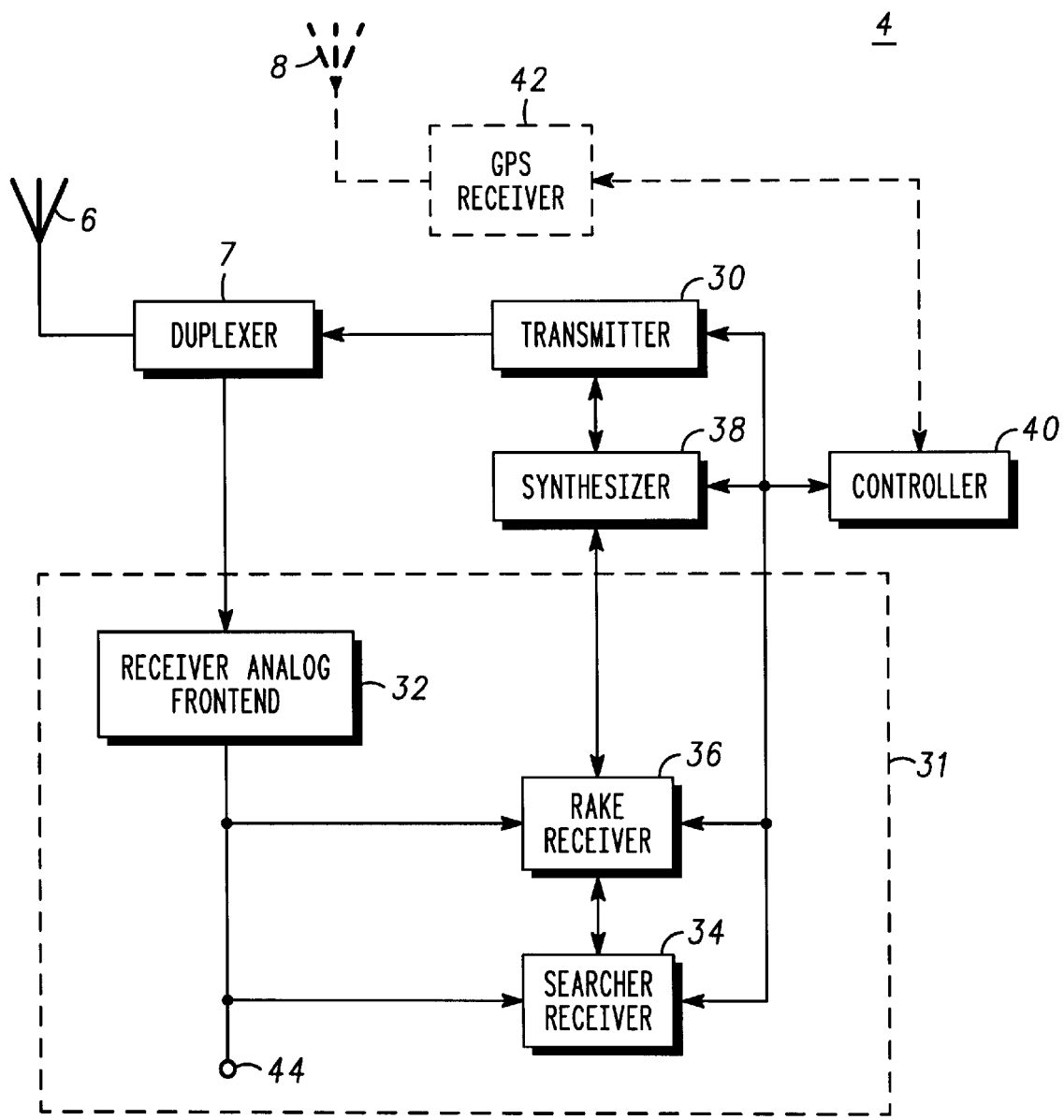
FIG. 2 shows a block diagram of an exemplary embodiment of a mobile station.

FIG. 2 shows a block diagram of an exemplary embodiment of the mobile station 4. The mobile station 4 is configured to receive and transmit spread spectrum communication signals to communicate with a plurality of base stations. The base stations (FIG. 1) transmit various spread spectrum signals, such as an information signal on a traffic channel, to the mobile station 4. In addition to traffic channels, the base stations broadcast other communication signals such as a spread spectrum pilot signal over a pilot channel, a synchronization signal over a synchronization channel, and a paging signal over a paging channel. The pilot channel is commonly received by all mobile stations within range and is used by the mobile station 4 for identifying the presence of a CDMA system, initial system acquisition, idle mode hand-off, identification of initial and delayed rays of communicating and interfering base stations, and for coherent demodulation of the synchronization, paging, and traffic channels. The synchronization channel is used for synchronizing mobile station timing to base station timing. The paging channel is used for sending paging information from the first base station 10 to mobile stations including mobile station 4. Signals transmitted by the base stations are spread using a pseudorandom noise (PN) sequence as is known in the art.

In alternate embodiments, the pilot signals comprise multiple pilot signals transmitted over a plurality of channels. Some of the pilot signals can be used, for example, for initial acquisition and signal strength determination. Other of the pilot signals can be used for storing group information, such as a group of base station identities.

The mobile station 4 comprises a first antenna 6, a conventional transmitter 30, cellular receiver 31, a synthesizer 38, and a controller 40. Conventional duplexer 7 allows for simultaneous transmission and reception as is known in the art. The controller 40 comprises a microprocessor to control operation of the mobile station 4. The controller may alternatively, or in addition, comprise any of logic circuitry, timing and clock circuitry, a digital signal processor, and microprocessor as is known in the art. This additional circuitry interconnection to other blocks of the mobile station 4, as well as the user interface (microphone, speaker, etc.) are not shown in FIG. 2 so as to not unduly complicate the drawing figure.

The cellular receiver 31 comprises an analog front end 32, a searcher receiver 34, and a rake receiver 36. The antenna 6 detects RF signals from the first base station 10 and from other base stations in the vicinity. Some of the received RF signals are direct line of sight rays transmitted by the base station. Other received RF signals are reflected or multi-path rays and are therefore delayed in time relative to the line of sight rays. Received RF signals are converted to electrical signals by the antenna 6 and provided to the analog front end 32. The analog front end 32 performs functions such as filtering, automatic gain control, and conversion of signals to baseband signals as is known in the art. The analog baseband signals are converted to streams of digital data for further processing.

Generally, the searcher receiver 34 detects pilot signals from the streams of digital data. The searcher receiver 34 despreads the pilot signals using a correlator and PN codes generated in the mobile station 4 as is known in the art. After this despreading, the signal values for each chip period are accumulated over a pre-selected interval of time, and the correlation energy is compared against a threshold level. Correlation energies exceeding the threshold level generally indicate a suitable pilot signal ray that can be used for pilot signal timing synchronization.

Once a suitable ray is identified and timing synchronization is accomplished, a demodulation branch of the RAKE receiver 36 is assigned to that signal path. The mobile station 4 can then demodulate information signals as is known in the art.

In the illustrated embodiment the mobile station 4 utilizes GPS signaling for geographic location analysis and thus employs a conventional GPS receiver 42. The second antenna 8 detects location information signals from the GPS satellites 18 (FIG. 1), and the GPS signals are processed by the conventional GPS receiver 42 as is known in the art and then forwarded to the controller 40. The GPS receiver 42 and the cellular receiver 31 may alternatively share at least some circuitry to reduce the size and cost of the mobile station 4. The combined GPS receiver and cellular receiver may then be generally referred to as a mobile station receiver.

In operation, the controller 40 periodically activates the GPS receiver 42 to detect and process location signaling transmitted by the GPS satellites 18 (FIG. 1). For example, the GPS receiver can periodically activate at a rate of substantially every five seconds, thirty seconds or minute. This periodic activation rate is referred to as a first rate, and other frequencies of activation may be chosen for the first rate as necessary. The more frequently the activation, the more up-to-date the position location information will be. The tradeoff for higher frequencies for the first rate of activation is battery drain.

After detecting the position location signals, the GPS receiver process the signals by performing conventional GPS receiver functions such as frequency conversion, filtering, and demodulation. One particular analysis in which the GPS receiver is involved is the determination as to whether the position location signals are even sufficient for a position location calculation. For example, the GPS receiver 42 will determine the signal strength of the received position location signals, and if the signals are below a predetermined threshold, then the position location signals are too weak to process. In the illustrated embodiment, the GPS receiver 42 sensitivity is −155 dBm. The GPS receiver 42 can perform the received signal strength measurement, or alternatively the GPS receiver 42 can forward a signal to another portion of the mobile station 4 (such as the cellular receiver 31 and/or the controller 40) for the received signal strength determination.

Further, the signal strength of the position location signals can be determined in any number of conventional methods. For example, and intermediate analog signal can be utilized for the calculation, or a digitized version of the baseband signal can be utilized. Other means for determining the quality of the link between the GPS receiver 42 and the GPS satellites 18 (FIG. 1) can alternatively be employed. For example, the bit error rate or frame erasure rate resulting from processing the position location signals can be used as a criteria for determining whether the received position location signals are suitable for processing.

If the position location signals are suitable for processing, normal operation continues and the position signals are used for geographic location as is known in the art. The GPS receiver 42 continues to periodically activate at the first predetermined rate to detect and process new position location signaling.

If the position location signals are not suitable for processing (e.g. too weak), the controller 40 decreases the frequency at which the GPS receiver 42 periodically activate to detect position location signaling. This is done to save battery power. The position location signals may be too weak based upon the position of the mobile station. For example, if the user is within a building, the satellite signals may not suitably penetrate the building for detection. If the user is deep within a building away from any windows, the satellite signals may be even weaker.

Thus, the controller 40 will decrease the frequency of GPS receiver 42 activation to a second, predetermined rate. This second predetermined rate can be on the order of every five minutes, ten minutes, twenty minutes, or more. In the illustrated embodiment, the rate of activation is reduced to once every twenty minutes. Once again, the rate of activation is a design tradeoff between how current the geographic location information is and battery conservation.

During each twenty minute period, at least a portion of the receiver, here GPS receiver 42, is deactivated to conserve power. However, the quality of the communication link between the mobile station 4 and the cellular base stations (FIG. 1) is constantly monitored. The controller 40 then reactivates the GPS receiver 42 responsive to the quality of the cellular communication link improving by a predetermined amount. The GPS receiver then attempts to detect position location signaling.

In determining whether the quality of the communication link has improved by a predetermined amount, the mobile station can use received signal strength of the received cellular signal. Alternatively, the mobile station can use bit error rate or frame erasure rate as the criteria.

For example, in its determination of the quality of the communication link, the mobile station makes several signal measurements. If received signal strength is used as the determination factor, the mobile station 4 makes a first received signal strength measurement of the cellular communication signal over a first predetermined period of time to form a long term signal strength. In the illustrated embodiment, the first predetermined period of time is one minute. This long term signal strength measurement is performed after the controller 40 causes the GPS receiver 42 to decrease its frequency of activation. The long term signal strength actually comprises an average of twenty signal strength measurements made within the first predetermined period of time. Each of the twenty signal strength measurements is over a hundred msec time period.

After the mobile station 4 makes the first nineteen signal strength measurements for the long term signal strength, the last one hundred msec measurement is made, and the long term signal strength comprises the average of the twenty measurements. In addition, the mobile station makes a second received signal strength measurement over a second predetermined period of time to determine a short term signal strength. The second predetermined period of time is shorter than the first predetermined period of time. In the illustrated embodiment, the short term signal strength comprises the twentieth signal strength measurement that was made for the long term signal strength. The short term signal strength is then compared to the long term signal strength. Thus, if the frequency of activation of the GPS receiver 42 is decreased to once every twenty minutes, the short term signal strength can be calculated and compared to the long term signal strength once every minute. It will be obvious to those skilled in the art that other time periods may be chosen for the short and long term signal strength measurements, and other methods can be used to calculate the short and long term signal strengths without deviating from the spirit of the invention.

If the short term signal strength improves in comparison to the long term signal strength by some predetermined amount (e.g. 20 dB), the controller 40 activates the GPS receiver 42 to attempt to detect the position location signaling. If the position signals are of sufficient strength, the controller 40 increases the frequency of activating the GPS receiver 42 back to the first predetermined rate and normal operation continues. If the short term signal strength is still too weak for processing, the GPS receiver 42 deactivates and operation in the low power mode continues- the controller continues to activate the GPS receiver 42 at the decreased frequency.

The controller can update the long term signal strength measurement to indicate a new baseline value in a variety of ways. For example, a new long term signal strength can be calculated for each one minute period. Alternatively, the long term signal strength value can be a long term moving average value in which measurements from different one minute periods (or other time periods) are considered.

The long term and short term signal strength measurements are based upon an analog version of the received signal produced by the receiver analog front end at port as is known in the art. Alternatively, a digitized version of the baseband signal appearing at port 44 may be utilized for signal strength calculation. Still further, the signal strength determination can be made after despreading the received signal. Thus, a received pilot signal can be despread by the searcher receiver 34 as is known in the art, and signal strengths can then be determined.

In alternate embodiments, other means are employed to determine a quality of the communication link between the mobile station 4 and at least one cellular base station (FIG. 1). For example, after the searcher receiver 34 despreads a received pilot signal, a long term bit error rate or frame erasure rate can be established as a baseline. The short term bit error rate (or frame erasure rate) is then periodically measured at a rate discussed above to determine whether the quality of the cellular communication link has sufficiently improved to activate the GPS receiver 42 prior to the next prescribed wakeup time.

The use of a separate GPS receiver 42 provides the mobile station with what may be referred to as autonomous GPS, wherein the mobile station interacts principally with the GPS satellites 18 (FIG. 1) for location determination. Alternatively, the base stations of the cellular communication network 2 (FIG. 1) may participate in the mobile station location determination using GPS as is known in the art, and this is referred to as network assisted GPS. Still further, forward link triangulation may be employed to determine the latitude and longitude information of the mobile station as is known in the art. The position location receiver portion would then be periodically activated to detect the base station triangulation signals. The cellular base stations may transmit the triangulation signals differently than the regular cellular communication signals so that the spirit of this invention may still be faithfully employed. For example, The triangulation signals may be transmitted at a higher power than the cellular communication signals. The initial decision as to whether to decrease the rate of activation of the GPS receiver is thus based upon analysis of the quality of the triangulation signals. Measurement of the long term and short term signal quality is then based upon the cellular communication signals.

Decreasing the rate of GPS receiver activation upon determining that the position location signals are not sufficient for location determination calculation conserves mobile station battery power. In addition, changing the rate of activation of the GPS receiver based upon the actual position location signaling rather than, say, the strength of the cellular communication signals provides for a more reliable determination criteria. This is because the cellular communication signals are largely uncorrelated with GPS signals transmitted by GPS satellites. Thus, a user can be deep within a building and away from a window so that GPS signals are weak or virtually undetectable. There may be, however, a picocell cellular base station transmitter deep within the building. Basing the initial decision as to whether to decrease the rate of activation of the GPS receiver on the quality of the cellular communication link could thus result in erroneous decisions.

The previous description of the preferred embodiments are provided to enable any person skilled in the art to practice the preferred embodiments. Various modifications to these embodiments will be readily apparent to those skilled in the art, and the generic principles defined herein may be applied to other embodiments without the use of the inventive faculty.

We claim:

1. A method of making a geographic location determination via a cellular telephone in signal communication with a base station, the method comprising:

attempting to detect a position location signal;

determining that a signal strength of the position location signal is too weak to use in a position location calculation;

deactivating at least a portion of a global positioning system (GPS) receiver responsive to determining;

receiving a cellular communication signal;

measuring a signal strength of a cellular communication signal;

reactivating the at least a portion of the GPS receiver responsive to the signal strength of the cellular communication signal increasing by a predetermined amount; and re-attempting to detect the position location signal responsive to reactivating.

2. The method of claim 1, wherein the step of measuring comprises:

making a first received signal strength measurement of the cellular communication signal over a first predetermined period of time to form a long term signal strength; and making a second received signal strength measurement over a second predetermined period of time to determine a short term signal strength, the second predetermined period of time shorter than the first predetermined period of time.

3. The method of claim 2 wherein the step of reactivating responsive to the signal strength increasing by the predetermined amount includes determining whether the short term signal strength is greater than the log term signal strength by a predetermined amount.

4. The method of claim 3 further comprising calculating the geographic location of the cellular telephone using the position location signal.

5. An apparatus for initiating a location determination via a cellular telephone, the apparatus comprising:

a receiver for processing cellular communication signals and global positioning system (GPS) signals; and a controller coupled to the receiver, the controller for causing at least a portion of the receiver to deactivate upon determining that received GPS signals are too weak to process, the controller causing the at least a portion of the receiver to reactivate and attempt to receive GPS signals upon determining that a strength of the cellular communication signals have increased by a predetermined amount.

6. The apparatus as in claim 5 wherein:

the receiver makes a first received signal strength measurement using the cellular communication signals over a first predetermined period of time to determine a long term signal strength, and responsive to the at least a portion of the receiver deactivating, the receiver periodically makes a second received signal strength measurement based on the cellular communication signals and over a second predetermined period of time to determine a short term signal strength for each of the second received signal strength measurements, the second predetermined period of time less than the first predetermined period of time, the controller causing the at least a portion of the receiver to re-activate and attempt to receive a GPS signal when the short term signal strength is greater than the long term signal strength by a predetermined amount.

7. The apparatus as in claim 6, wherein if after a predetermined amount of time elapses and the short term signal strength is not greater than the long term signal strength, the controller causes the at least a portion of the receiver to re-activate and attempt to receive a GPS signal.

8. The apparatus as in claim 5 wherein the at least a portion of the receiver comprises GPS receiver circuitry.

9. The apparatus as in claim 5 wherein the receiver comprises a GPS receiver and a cellular communication receiver.

10. The apparatus as in claim 9 wherein the GPS receiver shares at least a portion of the cellular communication receiver.

11. A method of determining when to activate a receiver in a cellular telephone to attempt to receive signals useful for a geographic location determination, the method comprising:

monitoring, over a first period of time and over a second period of time, a quality of a communication link between the cellular telephone and at least one base station, the first period of time greater in duration than the second period of time; and attempting to receive position location signaling when the quality of the communication link over the second period of time improves over the quality of the communication link over the first period of time by a predetermined amount.

12. The method of claim 11 wherein the quality of the communication link is indicated by any of bit error rate, frame erasure rate, and received signal strength.

13. In a code division multiple access (CDMA) cellular telephone in signal communication with at least one base station, an apparatus for geographic location analysis, the apparatus comprising:

a searcher receiver for measuring signal strength of a received pilot signal;

a global positioning system (GPS) receiver for periodically activating at a first predetermined rate to attempt to receive position location signaling at; and a controller coupled to the searcher receiver and the GPS receiver, the controller for causing the first predetermined rate to decrease in frequency to a second predetermined rate responsive to the GPS receiver failing in an attempt to receive position location signaling, wherein the controller causes the searcher receiver to measure, over a first predetermined period of time and a second predetermined period of time, a quality of a communication link between the CDMA cellular telephone and the at least one base station, the first predetermined period of time greater in duration than the second predetermined period of time, the controller for causing the GPS receiver to attempt to receive the position location signaling when the quality of the communication link over the second predetermined period of time improves compared to the quality of the communication link over the first predetermined period of time by a predetermined amount.

14. The apparatus as in claim 13 wherein the quality of the communication link comprises the signal strength of the received pilot signal.

15. The apparatus as in claim 14 wherein the controller causes the GPS receiver to switch from the second predetermined rate to the first predetermined rate responsive to the GPS receiver receiving position location signaling of sufficient signal strength.

16. A method of making a geographic location determination via a cellular telephone in signal communication with a base station, the method comprising:

attempting to detect a position location signal;

determining that the position location signal is insufficient for a position location calculation;

deactivating at least a portion of a global positioning system (GPS) receiver responsive to determining;

receiving a cellular communication signal;

measuring a signal strength of the cellular communication signal;

reactivating the at least a portion of the GPS receiver responsive to the signal strength of the cellular communication signal increasing by a predetermined amount; and re-attempting to detect the position location signal responsive to reactivating.

17. The method as in claim 16 wherein the step of reactivating includes detecting that a bit error rate exceeded a predetermined level.

18. A method of making a geographic location determination via a cellular telephone in signal communication with a base station, the method comprising:

attempting to detect a position location signaling;

determining that the position location signaling is insufficient for a position location calculation;

suspending the step of attempting responsive to determining;

receiving a cellular communication signal;

measuring a signal quality of the cellular communication signal;

noting an improvement in the signal quality of the cellular communication signal by a predetermined amount responsive to measuring; and re-attempting to detect the position location signaling responsive to noting the improvement.

19. The method as in claim 18, wherein the step of rioting indicates any of a bit error rate exceeding a predetermined level, a frame erasure rate exceeding a predetermined level, and a signal strength exceeding a predetermined level.

20. The method as in claim 16 wherein the step of reactivating includes detecting that a frame erasure rate improved by a predetermined amount.

21. The method as in claim 18 wherein the position location signaling comprises forward link triangulation signals.

22. The method as in claim 18 wherein the position location signaling comprises satellite signals.

23. The method as in claim 16 wherein the step of reactivating includes detecting that a signal strength improved by a predetermined amount.

* * * * *

UNITED STATES PATENT AND TRADEMARK OFFICE
CERTIFICATE OF CORRECTION

PATENT NO.     : 6,438,381 B1                                           Page 1 of 1
DATED          : August 20, 2002
INVENTOR(S)    : Nguyen et al.

It is certified that error appears in the above-identified patent and that said Letters Patent is hereby corrected as shown below:

<u>Column 10,</u>
Line 6, change "rioting" to -- noting --

Signed and Sealed this

Twenty-eighth Day of January, 2003

JAMES E. ROGAN
*Director of the United States Patent and Trademark Office*